United States Patent [19]

Kronenberg

[11] Patent Number: 5,055,782
[45] Date of Patent: Oct. 8, 1991

[54] METHOD FOR DETERMINING THE ABSOLUTE POSITION OF A POINTER IN AN INDICATING DEVICE, AND INDICATING DEVICE

[75] Inventor: Klaus Kronenberg, Schwalbach/Ts, Fed. Rep. of Germany

[73] Assignee: VDO Adolf Schindling AG, Frankfurt am Main, Fed. Rep. of Germany

[21] Appl. No.: 531,034

[22] Filed: May 31, 1990

[30] Foreign Application Priority Data

Jun. 19, 1989 [DE] Fed. Rep. of Germany ....... 3919926

[51] Int. Cl.$^5$ .............................................. G01B 7/30
[52] U.S. Cl. .................................................. 324/207.25
[58] Field of Search ............... 73/866.1; 324/200, 202, 324/207.11, 207.22, 207.25

[56] References Cited

U.S. PATENT DOCUMENTS

| | | |
|---|---|---|
| 3,977,248 | 8/1976 | Metzger ............................ 73/866.1 |
| 3,998,179 | 12/1976 | Dieterich et al. .................. 73/866.1 |
| 4,490,674 | 12/1984 | Ito .................................. 324/207.25 |

FOREIGN PATENT DOCUMENTS 266238  2/1971  U.S.S.R. ............... 73/866.1

Primary Examiner—Robert Raevis
Attorney, Agent, or Firm—Martin A. Farber

[57] ABSTRACT

A method determines the absolute position of a pointer in an indicating device in which the pointer is moved by a rotor (2) of a rotating-field (1) via a gearing (31). An indicating device is also disclosed. Indicating devices with gearing have the problem that no absolute reference between the position of the pointer (33) and the position of the rotor (2) in the rotating-field motor (1) is present when the device is started and the reference is lost. In order to restore the reference, the pointer (33) is moved by a rotating field in a rotating-field motor (1) in a predetermined direction of the rotating field against a stop (34). The rotating field is turned further in the direction of the rotating field. A signal induced in the field-generating part (4, 5) of the rotating-field motor by a movement of the rotor (2) contrary to the direction of the rotating field is detected, and from the angular position of the rotating field upon the occurrence of the induced signal, the angular position of the rotor at which the pointer rests against the stop is determined.

5 Claims, 2 Drawing Sheets

RESTORING PHASE — START

METHOD FOR DETERMINING THE ABSOLUTE POSITION OF A POINTER IN AN INDICATING DEVICE, AND INDICATING DEVICE

FIELD AND BACKGROUND OF THE INVENTION

The invention relates to a method of determining the absolute position of a pointer in an indicating device, the pointer being moved by a rotor of a rotating-field motor via a gearing. The invention relates also to an indicating device having a pointer which is moved by the rotor of a rotating-field motor via a gearing, and having a stop for the pointer, the rotating-field motor having at least 2 field-producing coils which are electrically connected to a control unit which produces a signal at the output for each coil.

In contradistinction to indicating instruments in which the pointer is acted on directly by a rotor in a coil arrangement, as, for instance, in a cross-coil rotating-magnet arrangement, it is advantageous, in certain fields of use, to drive the pointer via a gearing from a rotating-field motor. Depending on the transmission ratio of the gearing, the rotor must then carry out a larger or smaller number of revolutions in order to move the pointer through a given angle. The controlling system knows how many revolutions of the rotor are necessary in order to change the indication by a desired value. In this connection, however, there is the disadvantage that there is no longer a single relationship between the angular position of the rotor in the motor and the position of the pointer. A large number of positions of the pointer are associated with each angular position of the rotor in the motor. The absolute position of the pointer can therefore no longer be determined from the motor data alone.

This is disadvantageous, in particular if the power supply of the controlling system is interrupted for any reason and the controlling system loses the information as to the existing position of the pointer. This can occur in particular when the indicating device is used in automotive vehicles, in which, for instance, upon repair of the electrical equipment, the electrical connection to the battery must be completely interrupted for reasons of safety. The use of external sensors, for instance inductive approximation switches, mechanical limit switches, light barriers or the like, increases the cost of the indicating device. Furthermore, a larger number of structural parts automatically also means a greater weight, which is undesirable, particularly upon use in automobiles or airplanes. Furthermore, the space to house the external sensors is frequently not available.

SUMMARY OF THE INVENTION

It is an object of the invention to provide a method and an indicating device by which the absolute reference between the controlling system and the position of the pointer can be established without the use of external sensors.

According to the invention, in a method of the aforementioned type, the pointer is moved by a rotating field in the rotating-field motor in a predetermined direction of the rotating field against a stop, the rotating field is turned further in the direction of the rotating field, a signal induced in the field-producing part of the rotating-field motor by a movement of the rotor opposite to the direction of the rotating field is detected, and the angular position of the rotor at which the pointer rests against the stop is determined from the angular position of the rotating field upon the occurrence of the induced signal.

The invention is based on the following principle:

If the rotor of a rotating-field motor can no longer rotate since its output is blocked, for example because the pointer which is located at the output of the gearing lies against a stop, and the controlling field continues to move, then the rotor carries out a rotation opposite the actual direction of rotation of the field if the angular difference between the main axis of the rotor, which axis as a rule is formed by a magnet, and the main axis of the field is greater than 180°. In this case, the rotor "tips" out of a labile equilibrium, which is present upon an angular difference of precisely 180°, into a stable equilibrium which is present upon an angular difference of 0°. The two main axes of rotor and rotating field again coincide. Due to the movement of the rotor, a signal is induced in the coil arrangement which produces the rotating field. This signal can, for instance, occur as a voltage which is directed opposite the generating voltage. This signal can then be evaluated. Since the angular position of the rotating field at the time at which the signal occurs is known, the position of the stop of the pointer can be calculated by subtracting 180° from this angular position.

The rotating field can, in this connection, be turned continuously. For better resolution it is, however, advantageous for the rotating field to be turned stepwise. The signal which is induced by the backward-turning rotor, then necessarily appears after a given step. Since the angular increment passed over by the pointer for each step is known, the subtraction of the 180° can be effected very simply by counting backward a given number of steps.

In order to increase the precision of resolution it is advantageous to provide a pause of pre-selectable length between each of the steps. The rotor, of course, requires a certain period of time in order to turn backwards. This time is determined, among other things, by the inertia which the rotor opposes to its rotation. If a pause is inserted after every step, the rotor has sufficient time to turn back and align itself with the field. If the pauses are sufficiently dimensioned, it, therefore, cannot happen that the signal which indicates the backward rotation of the rotor occurs only when the rotating field has already rotated back too far, and therefore by an angle of far more than 180°.

The rotation of the rotating field is preferably continued after occurrence of the induced signal and only a second or subsequent induced signal is used to determine the absolute position of the pointer. When the system is started from any given condition, the relationship of the magnetic field to the angular position of the rotor is not defined. The magnetic field of the rotating-field motor must, however, be connected in a given position. This necessary establishing of an angle can result in an output signal in the coil arrangement if, for instance, the angular position of the rotor does not agree with the angular position of the field. In order to make certain that this signal is not erroneously evaluated for the determination of the position of the stop of the pointer, it is provided, in accordance with the invention, that only the second or a subsequent signal be used in order to determine whether the rotor lies against the stop or not. Even if the angular position of the rotor should happen to agree precisely with the angular position of the rotating field set, the proposed manner of procedure is not harmful. The rotor will in such case, to be sure, be moved against the stop and, after the rotation of the rotating field by somewhat more than 180°, produce a first signal which, theoretically, could be used to determine the stop position of the pointer. The rotor then turns further, the stop position of the pointer being actually determined only upon the second revolution since only the second pulse is "valid." The slight mechanical load on the pointer is immaterial.

For the last-mentioned effect it may happen that the pointer is moved briefly twice at the start of the determination procedure. This double movement could have a disturbing effect on the eye of the user or observer. In order to eliminate this disadvantage, it is provided, in accordance with the invention, that, during a learning phase, the angular position of the rotating field at which the signal is induced is determined and stored in nonvolatile manner and then, at the start of a determination phase, this angular position of the rotary field is set. In the learning phase, the pointer is moved twice slowly against the stop, the actual null point, i.e. the angular position of the rotating field at which the pointer rests against the stop, is calculated, and this value is stored, for instance in a non-volatile memory (EEPROM). Upon the starting of the system, for instance after a complete power failure, the rotating field is set to the stored value. If, after the applying of this value, a signal is produced by a rotation of the rotor, there is assurance that this is an error signal and it can be ignored.

According to the invention there is an indicating device of the aforementioned type wherein an evaluation circuit (14) is provided which compares the signals (25) at the output of the control unit (6) with the signals (26) at the input of the corresponding coil (45).

The signals at the output of the control unit (output signals) produce a magnetic field in each coil. The superimposing of the magnetic fields of each coil gives the resultant magnetic field. By changing the conditions of flow in the individual coils, the direction of the resultant magnetic field can be changed. For instance, a rotating field can be produced in the manner that the control unit produces a sinusoidal output signal for each coil, the output signals being electrically shifted in phase with respect to each other by an angle which corresponds to the solid angle between the individual coils of the coil arrangement. The sine signals can, of course, also be of step-shape development if the rotor of the rotating-field motor is moved stepwise. The evaluation circuit now examines whether the course of the signal at the output of the corresponding coils (input signals) agrees with the output signals of the control device. This will fundamentally always be the case except when the rotor is turning backward in order to again align itself with the field. In that case, the output signal of the control device no longer agrees with the input signal of the corresponding coil. The evaluation circuit can then produce a signal which indicates this non-agreement.

For this purpose, the evaluation circuit (14) advantageously has for each coil (4, 5) a subtractor (15, 16) which forms the difference between a voltage (26) over the coil (4, 5) and a voltage (25) at the associated output of the control unit (6). In the normal case, this difference follows a given proportionality. If both voltages have a sine form of difference amplitude, the difference voltage is also sinusoidal, its amplitude corresponding to the difference in amplitudes. This proportionality, however, will be disturbed if the rotor turns backward and induces an additional voltage in the coil.

In this connection a scaling device (scaler, 13) is advantageously provided which makes the amplitude of the two input voltages of each subtractor (15, 16) the same. The difference which the subtractor produces is then zero in the normal case. Only when the rotor turns backward and induces a voltage does a voltage other than zero appear at the output of the subtractor.

In this connection, each scaling device (13) advantageously has two voltage dividers (41, 42, 43, 4; 44, 45, 46, 5) for respective ones of the subtractors (15, 16). The scaling device can be produced in a simple manner with these voltage dividers.

In this connection, one of the two voltage dividers can have the corresponding coil (4, 5) and an ohmic resistor (43, 46) and the other voltage divider two ohmic resistors (41, 42; 44, 45). Voltage division by means of an ohmic or ohmic-inductive voltage divider is a simple method for scaling the voltages tapped.

In a preferred embodiment, the outputs of the subtractors (15, 16) are connected to a logic circuit (17) which produces an output signal when the signal of at least one subtractor output exceeds a predetermined value. As shown above, the output of the subtractor is generally equal to zero. Only if a signal occurs because the rotor turns backward does the voltage over the coil differ from the voltage at the output of the control unit. In that case the substractor produces an output signal. If several coils are present, as must be the case in a rotating-field motor, it can happen that no signal, or only a very small signal, which is scarcely measurable, is produced in one of the coils. In order to make certain that the evaluation device reliably detects a signal, the logic circuit is provided, it reacting already when a signal is induced only in one coil.

The control unit (6) advantageously has a digitally operating signal generator (9). The control unit can, therefore, produce a step-shaped output voltage very easily.

BRIEF DESCRIPTION OF THE DRAWING

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENT

Figure 1:
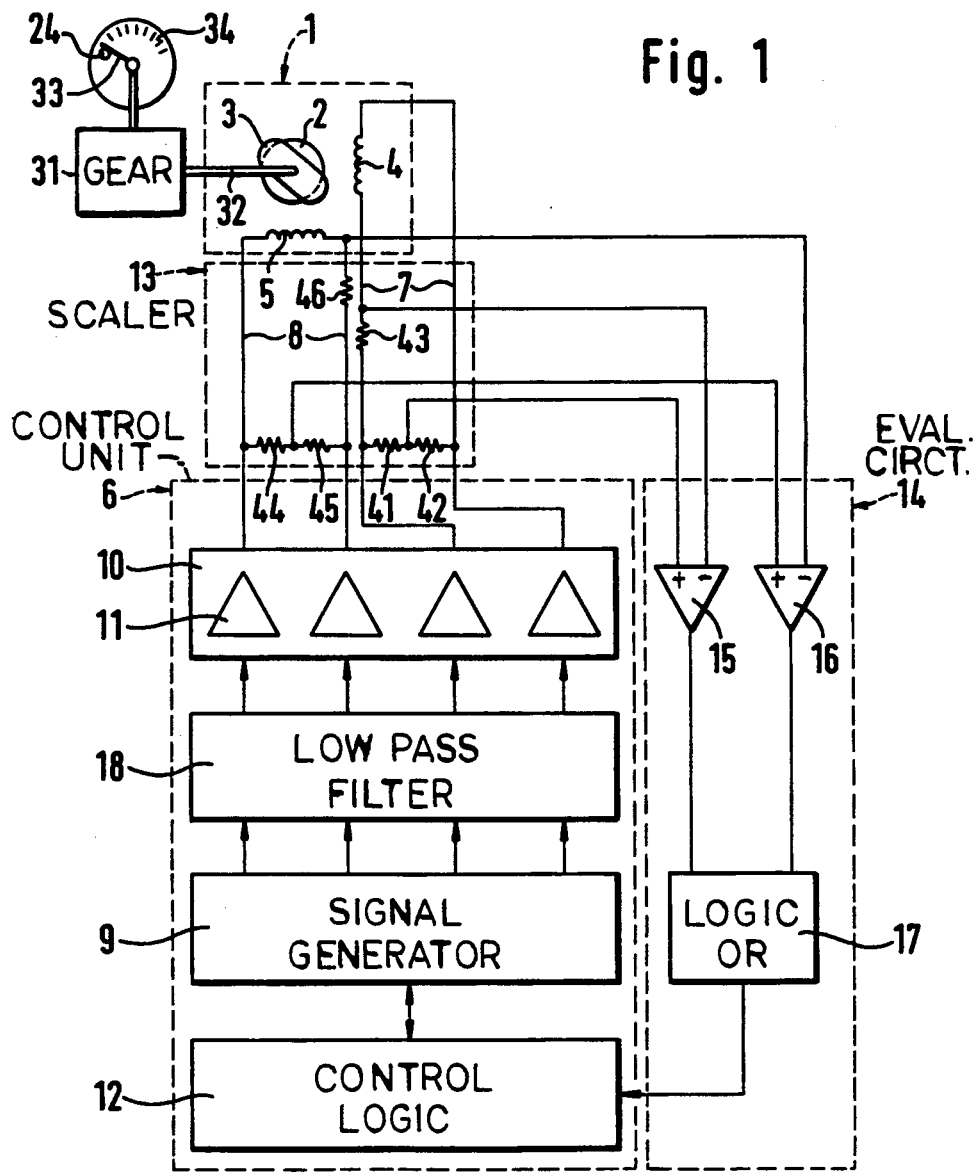
FIG. 1 is a circuit diagram of an indicating device.

A rotating-field motor 1 has a rotor 2 which bears a magnet 3. The magnet 3 is ordinarily a permanent magnet but it can also be developed as an electromagnet. The rotor 2 of the rotating-field motor 1 is connected to a gearing 31 by a shaft 32. At the output of the gearing 31, a pointer 33 is arranged, the pointer being moveable over a scale 34. At one end of the scale 34 there is a stop 24 which marks the zero point or another marked position of the pointer. If the pointer 33 is moved against the stop 24, all movement of the rotor 2 in the same direction is blocked via the gearing 31 and the shaft 32. Furthermore, the motor 1 has two coils 4, 5 the coil axes of which are 90° apart from each other. A control unit 6 produces for each coil 4, 5, a voltage which is fed to the coil 4 over a pair of lines 7 and to the coil 5 over a pair of lines 8. For this purpose, the control unit 6 has a signal generator 9 the signals of which are amplified in an amplifier 10 by driver stages 11. The signal generator 9 is a digital signal generator, i.e. for each coil it produces a sequence of predetermined voltage steps. The voltage difference can vary from step to step. It can be attempted in this way, for instance, to obtain a substantially sinusoidal course of the voltage. The output signals of the signal generator 9 are filtered in a low-pass filter 18. Therefore, a more or less sinusoidal voltage can be tapped off at the output of the control unit 6. The control unit 6 has a control logic 12 which controls the signal generator 9. The control logic 12 can be constructed, for instance, with the use of a microprocessor.

Within the rotating-field motor 1, a rotating magnetic field is produced by a difference in flow in the two coils 4, 5. The rotating magnetic field results from the superimposing of a magnetic field produced by the coil 4 on a magnetic field produced by the coil 5. The direction of the magnetic field depends essentially on the ratio of the flow in the two coils 4, 5. By control with two sinusoidal signals which are electrically 90° apart, a field which rotates, for instance, in counter-clockwise direction, as shown in FIG. 2, can be produced in the rotating-field motor 1. Upon a placing in operation of the rotating-field motor 1, a flow ratio and thus a direction of magnetic-field are arbitrarily established. For instance, only the coil 4 receives a current while the coil 5 remains without current. The resultant magnetic field is represented by the arrow 19. The angular position of the magnet 3 and that of the rotor 2 will thus, as a rule, not agree. The rotor 2 will therefore turn in the direction indicated by the arrow 20, so that the main direction, i.e. the north-south axis, of the magnet 3 agrees with the main direction 19 of the magnetic field. The magnetic field then turns further in the direction indicated by the arrow 21, the magnet 3 moving in the direction of the arrow 21'.

Figures 2A, 2B, 2C, 2D, 2E:
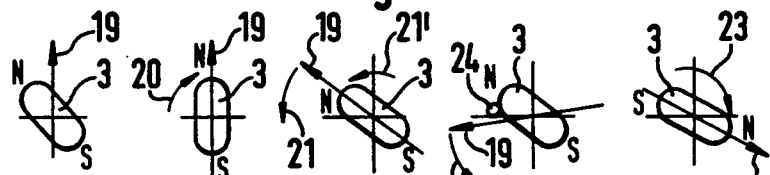
FIG. 2 shows different positions of the rotor with respect to the magnetic field.
Figure 3:
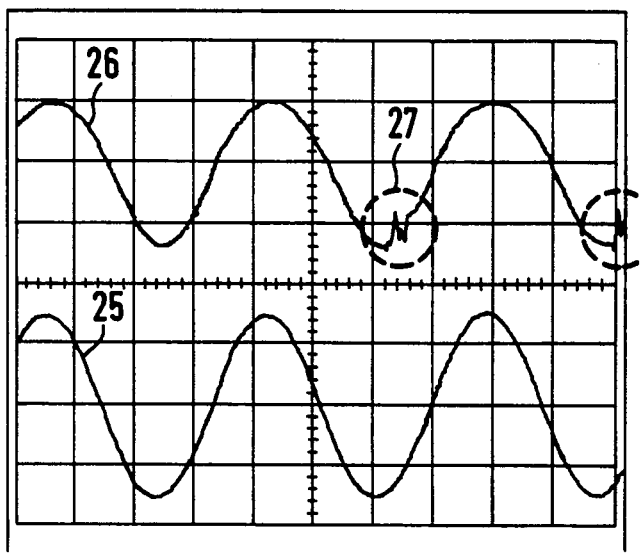
FIG. 3 shows two voltage curves representing the induced signals.

For reasons of simplicity, it has not been shown that, as a result of the loading by the gearing 31, a certain angular difference may occur between the magnetic field 19 and the magnet 3 (FIG. 2c). After a number of revolutions of the rotor 2 which is determined by the initial position of the pointer 33 and the transmission ratio of the gearing 31, the pointer 33 comes against a stop 24 so that further movement of the rotor 2 is blocked, as shown schematically in FIG. 2d. The magnetic field 19, however, continues to turn in the direction indicated by the arrow 22. When the magnetic field has turned further through an angle of 180°, the polarities of magnetic field 19 and magnet 3 are exactly opposite each other. The magnet 3 is in a labile equilibrium. If the magnetic field 19 is now turned further by a small angle in the original direction, the magnet 3 "tips" and turns backward opposite to the direction of rotation of the magnetic field 19 in order to align itself again with the magnetic field 19 (FIG. 2e). By this movement, the magnet 3 induces a voltage in the two coils 4, 5 which is opposite to the feed voltage. In FIG. 3 the output voltage of the control unit 6 has been shown as feeding voltage 25. A voltage 26 is tapped off via the coil 5. At the moment that the magnet 3 turns back opposite to the normal direction of rotation of the field, it induces a signal 27.

This signal is evaluated in an evaluation circuit 14. The evaluation circuit 14 is provided, for each coil 4, 5, with a subtractor 15, 16, the outputs of which are connected to an OR circuit 17. The inputs of the two subtractors are provided in each case with voltages which have been so scaled via a scaler 13 that the maximum values of the amplitudes of the oscillations fed to the two inputs of the subtractors 15, 16 are the same. The scaling device is provided, for each coil 4, 5, with a bridge circuit one branch of which has a voltage divider with two ohmic resistors 41, 42 and 44, 45 while the other branch has an ohmic-inductive voltage divider consisting of the coil 4 and the ohmic resistor 43 or the coil 5 and the ohmic resistor 46, respectively. Since the operating frequency with which the rotating field rotates is known, the voltage dividers, and thus the bridge, can be so dimensioned that in the normal case, i.e. when the magnet 3 follows the field 19 unimpeded, the same voltage drop is obtained over the coil 4 as over the ohmic resistor 42 and the same voltage drop is obtained over the coil 5 as over the resistor 45.

Figure 4:
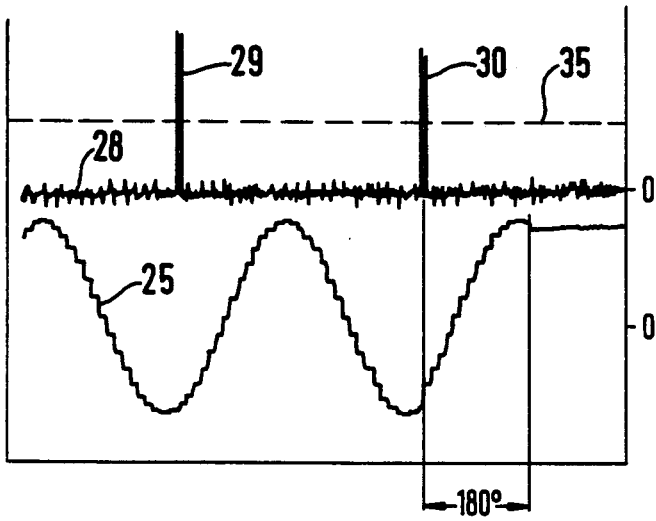
FIG. 4 shows two voltage curves, one of which represents the output of a subtractor.

The output of the subtractors 15, 16 is therefore, as a rule, approximately equal to zero. This is shown in FIG. 4 by the curve 28 which represents the output signal of the subtractor 14. Only in the event that the rotor 2 turns backward, namely after the field is shifted 180°, is a voltage which causes the voltage over the coils 4, 5 to differ from the voltages over the resistors 41, 44 produced within the coils 4, 5. A voltage pulse 29 is produced. This voltage pulse is greater than a predetermined limit value 35. The logic OR circuit 17 produces a signal at its output whenever at least one of the subtractors 15, 16 produces a signal exceeding the threshold value 35 at its output. In this way, assurance is had that each movement of the rotor 2 is recognized even if, as a result of unfavorable geometrical conditions, a sufficiently large voltage is induced in only one of the two coils. The logic circuit 17, which is therefore developed essentially as an OR member, applies its output signal to the control logic 12. When the control logic 12 is established by means of a microprocessor, the output signal of the logic circuit 17 can be conducted, for example, to an interrupt input of the microprocessor.

The manner of operation of the indicating device will be described with reference to FIG. 4. The signal generator 9 produces, for each coil 4, 5, a stepped output signal 25, which, aside from the steps, is substantially sinusoidal. After every change in voltage there is a short pause. The voltages for the two coils 4, 5 shifted 90° in phase from each other. At a given moment, namely when the pointer 33 has come against the stop 24, the rotor 2 can no longer continue to rotate. The field which is produced by the coils 4, 5, however, continues to rotate. When the field has turned a further 180°, the rotor 2 turns backward opposite the direction of rotation of the field. The magnet 3 induces a voltage. One of the two subtractors 15, 16 therefore produces an output signal 29. Since, however, one is not certain whether this output signal 29 comes from the fact that the rotor has turned 180° after reaching the stop (FIG. 2e) or whether it has only aligned itself with the field, as can happen upon the connecting of the arrangement (FIG. 2b), a further rotation of the field is carried out as a safety measure. The pointer then comes again against the stop and blocks the further rotation of the rotor. Only after the field is turned by a further 180° does the rotor jump back and produce another pulse 30. 180° later therefore, is exactly the time in the voltage curve 25 that the pointer 33 has come to rest against the stop 24.

Figure 5:
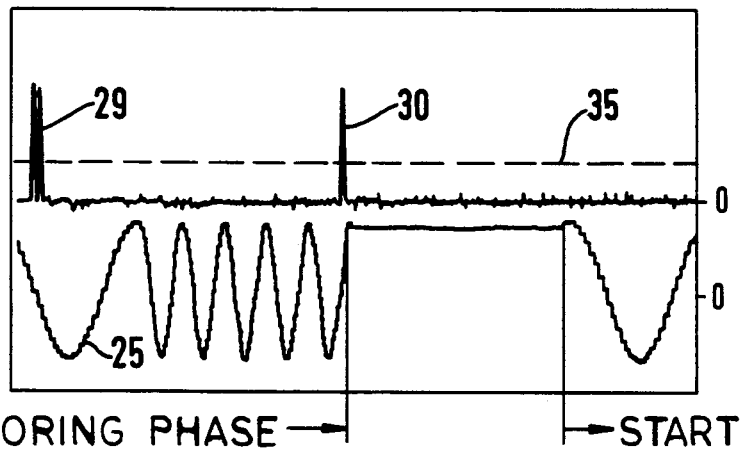
FIG. 5 shows a complete voltage curve for the control of a pointer.

In order to avoid the double movement of the rotor against the stop, a so-called learning phase is provided in order to be able reliably to state, upon the occurrence of a pulse, whether this pulse can be used to determined the absolute amount between the stop position of the pointer and the position of the rotor in the motor. For this purpose, the rotor is so moved in the learning phase that the pointer is slowly moved twice against the stop. The actual zero point, i.e. the time in the curve of the feed voltage or the electrical angle at which the pointer 33 is moved against the stop, is calculated and this zero point is stored in a non-volatile memory, for instance an EEPROM. Since the rotor is placed in any position on the transmission shaft 32, i.e. there is no exact reference between the rotor alignment and the pointer movement, the zero point differs for each indicating device. When the zero point has once been determined, a correct zero point can be obtained each time upon starting. Upon restarting, precisely the flow which has been determined as corresponding to the zero point is set. If the rotor now moves, one knows that this signal is an error signal and can be ignored. This error signal is shown as signal 29 in FIG. 5. Only upon occurrence of the actual signal 30 is it known that the pointer is in the stop position. The control logic 12 now waits for a predetermined period of time before it starts the actual indication with renewed control of the signal generator 9.

As can be noted in particular from FIG. 4, the control voltage 25 of the control device 6 is of step shape, a given time during which the flow ratio of the coils 4, 5 is not changed passing between each individual step. This time is sufficient to permit the rotor to turn backward when the field has turned through more than 180° after the pointer was brought against the stop. The control device 6 sets the magnetic field in the rotating-field motor 1 therefore to a new angle and waits a certain period of time. Then, by means of the subtractor 15, 16, it is tested whether a voltage peak 29, 30 has occurred. If it has not, then a new angle is set. If it has, then the motor was against the stop. The return phase is thus at an end. The absolute reference point is produced and a desired position can now be moved towards. The indicator can commence its normal activity.

I claim:

1. A method of determining the position of a pointer in an indicating device, the device having a rotating-field motor with a rotor, there being a gearing interconnecting the rotor and the pointer, the pointer being moved by the rotor of the rotating-field motor via the gearing, the method comprising the steps of moving the pointer by rotation of a field in the motor in a predetermined direction of rotation against a stop, the field being rotated further in the predetermined direction of rotation;

detecting a signal induced in the field-producing part of the motor by a movement of the rotor opposite to the direction of the rotating field; and determining the angular position of the rotor at which the pointer rests against the stop from the angular position of the rotating field upon the occurrence of the induced signal.

2. A method according to claim 1, wherein the rotating field is turned continuously.

3. A method according to claim 1, wherein the rotating field is turned stepwise there being a pause of preselectable length between each of the steps.

4. A method according to claim 1, wherein the rotation of the rotating field continues after occurrence of the induced signal and only a second or subsequent value of induced signal is used in said determining step to determine the position of the pointer.

5. A method according to claim 1, further comprising a step of implementing a learning phase; and wherein
   during the learning phase, there is a step of storing the angular position of the rotating field at which the signal is induced and is determined, the storing being in a non-volatile manner and then, at the start of a determination phase, there is a further step of setting the position of the rotary field.

* * * * *